(12) United States Patent
Luo et al.

(10) Patent No.: US 11,075,793 B2
(45) Date of Patent: Jul. 27, 2021

(54) METHOD FOR NETWORK MANAGEMENT BASED ON NETCONF PROTOCOL, AND ASSOCIATED NETWORK DEVICE

(71) Applicant: Telefonaktiebolaget LM Ericsson (publ), Stockholm (SE)

(72) Inventors: Wei Luo, Beijing (CN); Yun Li, Beijing (CN)

(73) Assignee: Telefonaktiebolaget LM Ericsson (publ), Stockholm (SE)

( * ) Notice: Subject to any disclaimer, the term of this patent is extended or adjusted under 35 U.S.C. 154(b) by 0 days.

(21) Appl. No.: 16/331,646

(22) PCT Filed: Sep. 19, 2016

(86) PCT No.: PCT/CN2016/099321
§ 371 (c)(1),
(2) Date: Mar. 8, 2019

(87) PCT Pub. No.: WO2018/049677
PCT Pub. Date: Mar. 22, 2018

(65) Prior Publication Data
US 2019/0245732 A1    Aug. 8, 2019

(51) Int. Cl.
*G06F 15/177* (2006.01)
*H04L 12/24* (2006.01)
*H04L 29/06* (2006.01)

(52) U.S. Cl.
CPC ...... *H04L 41/0273* (2013.01); *H04L 41/0813* (2013.01); *H04L 41/0859* (2013.01); *H04L 67/40* (2013.01)

(58) Field of Classification Search
CPC ... G06F 8/65; G06F 9/54; H04L 12/18; H04L 41/0681; H04L 41/08; H04L 41/082;
(Continued)

(56) References Cited

U.S. PATENT DOCUMENTS

| 5,452,433 A * | 9/1995 | Nihart | G06F 9/54 |
| | | | 709/223 |
| 8,248,958 B1 * | 8/2012 | Tulasi | H04L 43/50 |
| | | | 370/241 |

(Continued)

FOREIGN PATENT DOCUMENTS

| CN | 101321080 A | 12/2008 |
| CN | 101453355 A | 6/2009 |

(Continued)

OTHER PUBLICATIONS

Bierman, A., "Network Configuration Protocol (NETCONF) Base Notifications," Internet Engineering Task Force (IETF), Request for Comments: 6470, Category: Standards Track, ISSN: 2070-1721, Feb. 2012, 15 pages.

(Continued)

*Primary Examiner* — Dustin Nguyen
(74) *Attorney, Agent, or Firm* — Sage Patent Group

(57) ABSTRACT

The present disclosure discloses a method used in a network device for network management based on NETwork CONFiguration (NETCONF) protocol, and an associated network device. The method includes: receiving a Remote Procedure Call (RPC) message from a network management system, the RPC message instructing the network device to perform an edit operation on the network device's configuration; generating a configuration change notification based on the received RPC message to indicate that the network device's configuration has changed, the configuration change notification indicating a target of the edit operation, a type of the edit operation, and a value of the edit operation; and transmitting the configuration change notification to the network management system.

16 Claims, 4 Drawing Sheets

(58) Field of Classification Search
CPC . H04L 41/0803; H04L 41/0813; H04L 43/50; H04L 67/02; H04L 41/20; H04L 41/0226
See application file for complete search history.

(56) References Cited

U.S. PATENT DOCUMENTS

| | | | |
|---|---|---|---|
| 10,374,886 B1* | 8/2019 | A | H04L 41/20 |
| 2003/0158942 A1 | 8/2003 | Frank et al. | |
| 2009/0154374 A1 | 6/2009 | Jaatinen | |
| 2010/0057849 A1* | 3/2010 | Ji | H04L 41/0681 709/203 |
| 2014/0078930 A1* | 3/2014 | Bevemyr | H04L 41/0226 370/254 |
| 2014/0337467 A1* | 11/2014 | Pech | H04L 67/02 709/217 |
| 2014/0365621 A1* | 12/2014 | Vieira | H04L 12/18 709/220 |
| 2016/0344659 A1* | 11/2016 | Chen | H04L 41/0803 |
| 2016/0350095 A1* | 12/2016 | Ramachandran | G06F 8/65 |
| 2019/0052526 A1* | 2/2019 | Zhang | H04L 41/08 |
| 2019/0081855 A1* | 3/2019 | Clemm | H04L 41/0803 |

FOREIGN PATENT DOCUMENTS

| | | |
|---|---|---|
| CN | 102148698 A | 8/2011 |
| CN | 102891768 A | 1/2013 |
| EP | 2166699 A1 | 3/2010 |

OTHER PUBLICATIONS

Bjorklund, M., Ed., "YANG—A Data Modeling Language for the Network Configuration Protocol (NETCONF)," Internet Engineering Task Force (IETF), Request for Comments: 6020, Category: Standards Track, ISSN: 2070-1721, Oct. 2010, 173 pages.

Chisholm, S., et al., "NETCONF Event Notifications," Internet Engineering Task Force (IETF), Network Working Group, Request for Comments: 5277, Category: Standards Track, Jul. 2008, 35 pages.

Enns, R., Ed., et al., "Network Configuration Protocol (NETCONF)," Internet Engineering Task Force (IETF), Request for Comments: 6241, Category: Standards Track, ISSN: 2070-1721, Jun. 2011, 113 pages.

Schoenwaelder, J., Ed., "Common YANG Data Types," Internet Engineering Task Force (IETF), Request for Comments: 6021, Category: Standards Track, ISSN: 2070-1721, Oct. 2010, 26 pages.

International Search Report and Written Opinion for International Patent Application No. PCT/CN2016/099321, dated Jun. 1, 2017, 11 pages.

International Preliminary Report on Patentability for International Patent Application No. PCT/CN2016/099321, dated Jan. 17, 2019, 8 pages.

Extended European Search Report issued in corresponding EP Application No. 16916057.9 dated Mar. 26, 2020, 07 Pages.

* cited by examiner

METHOD FOR NETWORK MANAGEMENT BASED ON NETCONF PROTOCOL, AND ASSOCIATED NETWORK DEVICE

This application is a 35 U.S.C. § 371 national phase filing of International Application No. PCT/CN2016/099321, filed Sep. 19, 2016, the disclosure of which is incorporated herein by reference in its entirety.

TECHNICAL FIELD

The present disclosure relates to network management, and more particularly, to a method used in a network device for network management based on NETwork CONFiguration (NETCONF) protocol, and the associated network device.

BACKGROUND

This section is intended to provide a background to the various embodiments of the technology described in this disclosure. The description in this section may include concepts that could be pursued, but are not necessarily ones that have been previously conceived or pursued. Therefore, unless otherwise indicated herein, what is described in this section is not prior art to the description and/or claims of this disclosure and is not admitted to be prior art by the mere inclusion in this section.

The NETCONF protocol is a network management protocol developed and standardized by the Internet Engineering Task Force (IETF). It provides mechanisms to install, manipulate, and delete the configuration of network devices. Its operations are realized on top of a simple Remote Procedure Call (RPC) layer. The NETCONF protocol uses an Extensible Markup Language (XML) based data encoding for the configuration data as well as the protocol messages. The protocol messages are exchanged on top of a secure transport protocol.

The NETCONF protocol uses a simple RPC-based mechanism to facilitate communication between a client (also referred to as a NETCONF client) and a server (also referred to as a NETCONF server). The client can be a script or application typically running as part of a network manager. The server is typically a network device. The terms "device" and "server" are used interchangeably in this document, as are "client" and "application".

FIG. 1 illustrates a structure diagram of the NETCONF protocol. As shown in FIG. 1, the NETCONF protocol can be conceptually partitioned into four layers: a Content layer, an Operations layer, a RPC layer and a Transport layer. The Transport layer provides a communication path between a client and a server. The RPC layer provides a simple, transport-independent framing mechanism for encoding RPCs. The Operations layer defines a set of base protocol operations to retrieve and edit the configuration data. The base operations may be invoked as RPC methods with XML-encoded parameters. The Content layer consists of configuration data and notification data.

The NETCONF Data Modeling Language (NETMOD) Working Group has completed work to define a "human-friendly" modeling language for defining the semantics of operational data, configuration data, notifications, and operations, called YANG. YANG is defined in RFC 6020, and is accompanied by the "Common YANG Data Types" found in RFC 6021. YANG is a data modeling language used to model configuration and state data manipulated by the NETCONF protocol, NETCONF remote procedure calls, and NETCONF notifications.

A Yang module has been defined to allow a NETCONF client to receive notifications for some common system events. The YANG module specifies a small number of event notification messages for use within the 'NETCONF' stream, and accessible to clients via the subscription mechanism described in [RFC5277].

These notifications pertain to configuration and monitoring portions of the managed system, not the entire system. A server MUST report events that are directly related to the NETCONF protocol. A server MAY report events for non-NETCONF management sessions, using the 'session-id' value of zero. This module defines a notification (i.e., the "netconf-config-change" notification) for the 'NETCONF' stream to notify a client application that the NETCONF server state has changed. The "netconf-config-change" notification is generated when the NETCONF server detects that the server capabilities have changed, and indicates which capabilities have been added, deleted, and/or modified.

FIG. 2 depicts a tree structure of the "netconf-config-change" notification. Event type itself indicates that the system configuration has changed. This event could alert an attacker that specific configuration data nodes have been altered.

As shown in FIG. 2, the "netconf-config-change" notification may have three elements, i.e., "changed-by", "datastore" and "edit". The "changed-by" element may indicate whether the server or a specific user management session made the configuration change, and identify the user name, session-id, and source host address associated with the configuration change, if any. The "datastore" element may indicate which datastore has been changed. This data can be used to determine if the non-volatile startup configuration data has been changed. The "edit" element identifies the specific edit operations and specific datastore subtree(s) that have changed. This data could be used to determine if specific server vulnerabilities may now be present.

As illustrated in FIG. 2, the "edit" element contains two leaves, i.e., target and operation. No leaf is defined for its value. So, from the "netconf-config-change" notification, the user can only know which node is changed and what the operation is. But, the user can't know the value configured to. If the user wants to know what value is configured, he/she has to send another RPC message to get the node's value in datastore.

SUMMARY

It is an object of the present disclosure to provide a method to add a new leaf "value" by augmenting the "edit" element, so that the "netconf-config-change" notification contains all the necessary information for an edit operation: a target of the edit operation, a type of the edit operation, and a value of the edit operation (i.e., a value configured for the edit operation).

In a first aspect, a method used in a network device for network management based on NETCONF protocol. The method includes: receiving a RPC message from a network management system, the RPC message instructing the network device to perform an edit operation on the network device's configuration; generating a configuration change notification based on the received RPC message to indicate that the network device's configuration has changed, the configuration change notification indicating a target of the edit operation, a type of the edit operation, and a value of the edit operation; and transmitting the configuration change notification to the network management system.

In an embodiment, said generating the configuration change notification includes: building a new datastore based on the received RPC message and a current datastore, the current datastore storing a current configuration before the edit operation and the new datastore storing a new configuration after the edit operation; comparing the new datastore with the current datastore; creating a difference datastore based on the comparing, the difference datastore storing a configuration difference between the new configuration and the current configuration; and generating the configuration change notification based on the configuration difference.

In an embodiment, said generating the configuration change notification based on the configuration difference includes: setting the value of the edit operation based on the configuration difference.

In an embodiment, the type of the edit operation indicates deleting the target, and the value of the edit operation is null.

In an embodiment, the type of the edit operation indicates creating or modifying the target, and the value of the edit operation indicates a value the target of the edit operation is created or modified to have.

In a second aspect, a network device is provided for network management based on NETCONF protocol. The network device includes: a receiving unit configured to receive a RPC message from a network management system, the RPC message instructing the network device to perform an edit operation on the network device's configuration; a generating unit configured to generate a configuration change notification based on the received RPC message to indicate that the network device's configuration has changed, the configuration change notification indicating a target of the edit operation, a type of the edit operation, and a value of the edit operation; and a transmitting unit configured to transmit the configuration change notification to the network management system.

In a third aspect, a network device is provided for network management based on NETCONF protocol. The network device includes: a processor; and a memory storing instructions that when executed on the processor, cause the network device to: receive a RPC message from a network management system, the RPC message instructing the network device to perform an edit operation on the network device's configuration; generate a configuration change notification based on the received RPC message to indicate that the network device's configuration has changed, the configuration change notification indicating a target of the edit operation, a type of the edit operation, and a value of the edit operation; and transmit the configuration change notification to the network management system.

The above embodiments of the first aspect are also applicable for the second and third aspects.

With above embodiments of the present disclosure, the network device may inform the network management system of all necessary information for an edit operation by adding a "value" element in the "netconf-config-change" notification, so that the network management system can monitor the network device just based on the notification without extra actions or tools. This may result in an improvement in efficiency and convenience of the network management.

BRIEF DESCRIPTION OF THE DRAWINGS

The above and other objects, features and advantages will be more apparent from the following description of embodiments with reference to the figures, in which.

DETAILED DESCRIPTION OF EMBODIMENTS

Hereinafter, the present disclosure is described with reference to embodiments shown in the attached drawings. However, it is to be understood that those descriptions are just provided for illustrative purpose, rather than limiting the present disclosure. Further, in the following, descriptions of known structures and techniques are omitted so as not to unnecessarily obscure the concept of the present disclosure.

Figure 3:
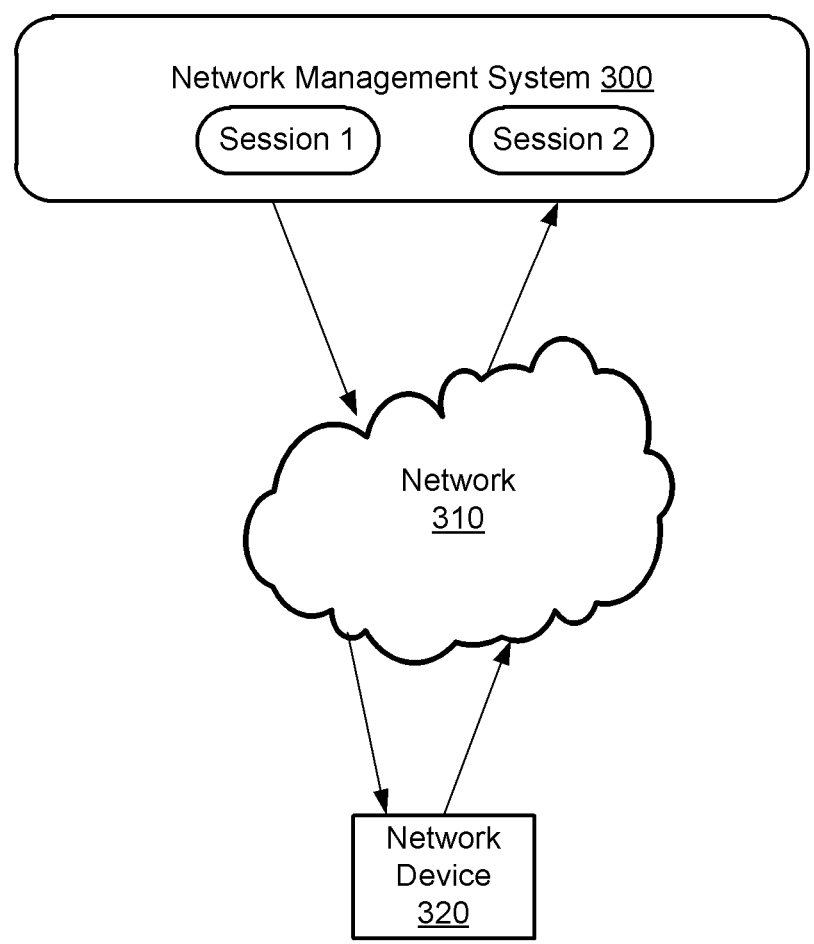
FIG. 3 is a schematic diagram illustrating an exemplary network architecture for use in network management according to an embodiment of the present disclosure.

FIG. 3 is a schematic diagram illustrating an exemplary network architecture for use in network management according to an embodiment of the present disclosure. The network architecture involves a network management system 300, a network 310 and a network device 320. The network management system 300 and the network device 320 are examples of a NETCONF client and a NETCONF server, respectively. The network 310 may be either a wireless network such as the $5^{th}$ Generation (5G) network, or a wired network.

As shown in FIG. 3, there are two user sessions connected to the network device 320 in the network management system 300. Session 1 is responsible for configurations on the network device 320. Session 2 is responsible for monitoring configuration operations on the network device 320. For example, when Session 1 is to make a specific configuration on the network device 320 (e.g., this may be done by configuring the "edit-config" in the Yang module), a RPC message is sent from the network management system 300 to the network device 320 via the network 310. In response to the RPC message, the configuration is applied on the network device 320. Thereafter, the network device 320 will generate and send a "netconf-config-change" notification to Session 2 to indicate that the network device 320's configuration has changed.

According to an embodiment of the present disclosure, the "netconf-config-change" notification indicates a target of the edit operation, a type of the edit operation, and a value of the edit operation.

Figure 4:
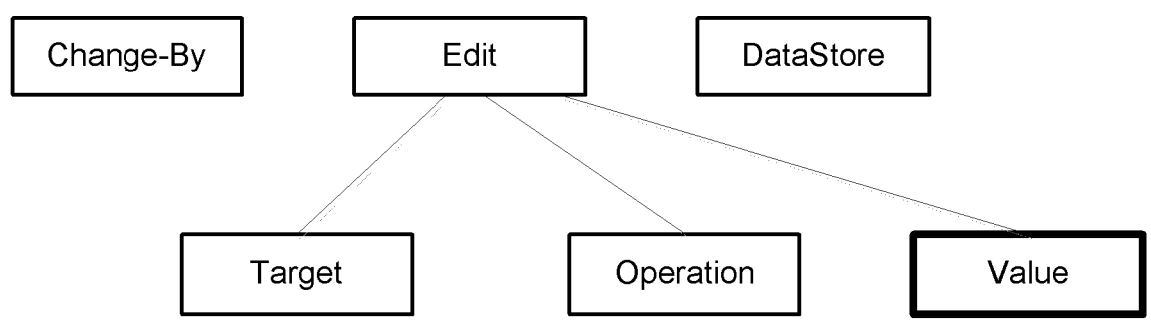
FIG. 4 illustrates an exemplary tree structure of the "netconf-config-change" notification according to an embodiment of the present disclosure.

FIG. 4 illustrates an exemplary tree structure of the "netconf-config-change" notification according to an embodiment of the present disclosure.

Figure 1:
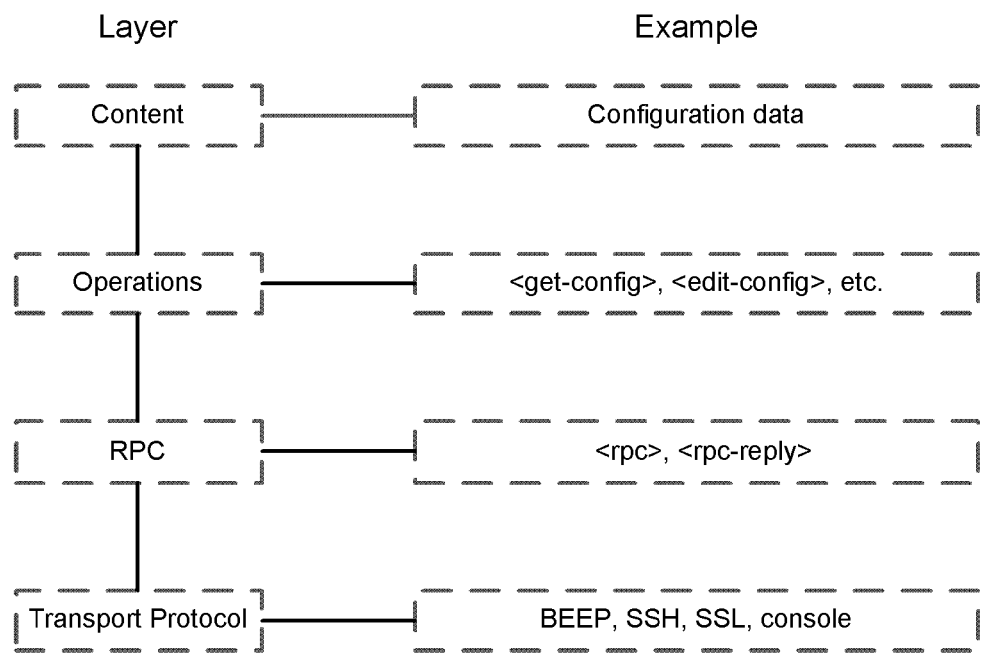
FIG. 1 illustrates a structure diagram of the NETCONF protocol.
Figure 2:
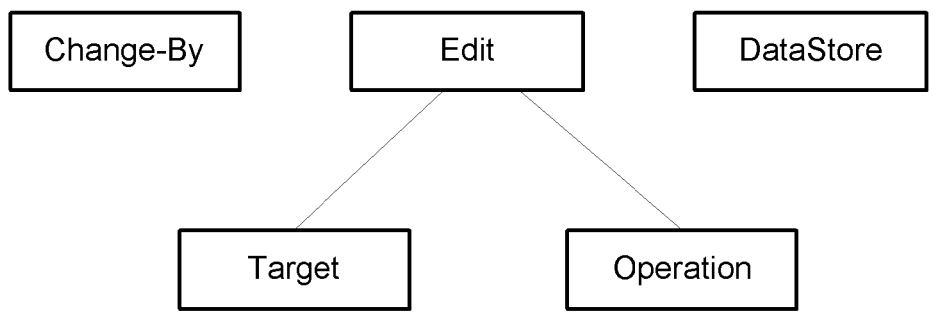
FIG. 2 depicts a tree structure of the "netconf-config-change" notification.

As shown in FIG. 4, the "netconf-config-change" notification may have three elements, i.e., "changed-by", "datastore" and "edit". The "changed-by" element and the "datastore" element are the same as those illustrated in FIG. 2, and thus detailed explanations thereof are omitted here. As illustrated, in addition to the leafs "Target" and "Operation," the "edit" element further involves a new leaf, i.e., "Value." The leaf "Value" indicates a value of the edit operation, i.e., a value configured for the edit operation.

An example of the YANG module definition according to the present disclosure may be presented as follows:

```
augment "/ncn:netconf-config-change/ncn:edit" {
    description "augment the edit list to report configuration
    changes";
    leaf value {
        type string;
        description "if the operation is create or modify, it is the
value which is configured to.
            if the operation is delete, it is null";
    }
}
```

Assume that the edit operation is to create a specific target, e.g., A, as a value of "a". In this case, the "Target" is A, the "Operation" is "create," and then the "Value" is "a". In other words, the edit operation is to create A as "a" on the network device 320.

With the "netconf-config-change" notification configured in this way, the network management system can monitor the network device just based on the notification without extra actions or tools. This may result in an improvement in efficiency and convenience of the network management.

Figure 5:
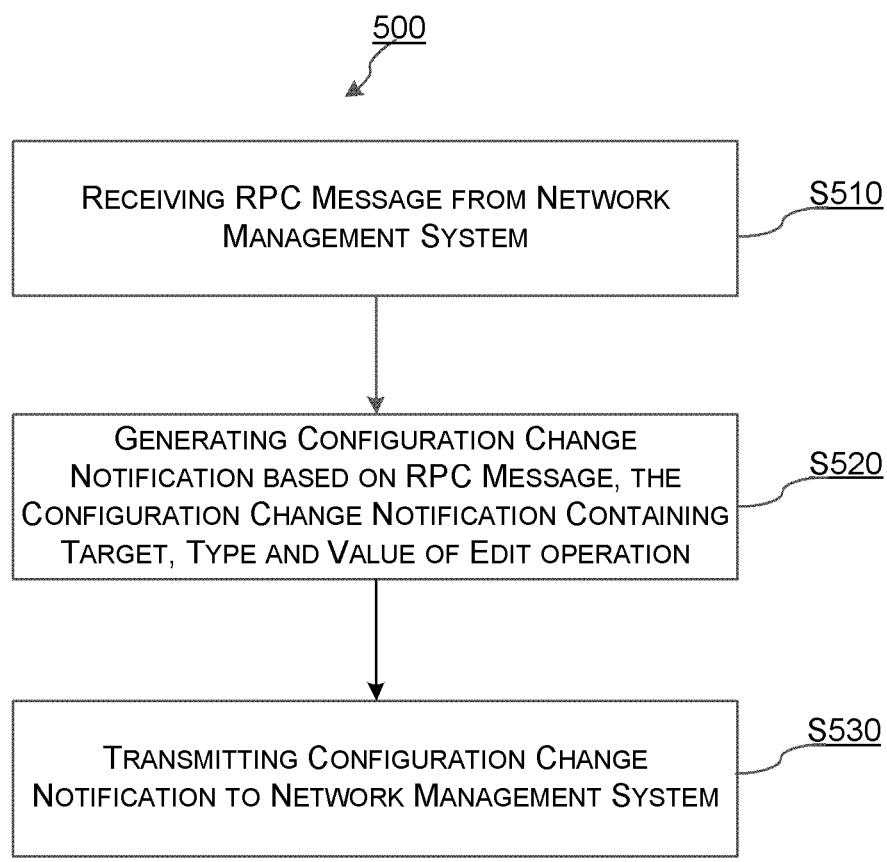
FIG. 5 is a flowchart illustrating a method 500 used in a network device for network management based on the NETCONF protocol according to an embodiment of the present disclosure.

FIG. 5 is a flowchart illustrating a method 500 used in a network device for network management based on the NETCONF protocol according to an embodiment of the present disclosure. For example, the network device may be the network device 320 in FIG. 3.

At step S510, the network device receives a RPC message from a network management system. For example, the network management system may be the network management system 300 in FIG. 3. The RPC message instructs the network device to perform an edit operation on the network device's configuration.

At step S520, the network device generates a configuration change notification based on the received RPC message. The configuration change notification indicates that the network device's configuration has changed. The configuration change notification may specifically indicate a target of the edit operation, a type of the edit operation, and a value of the edit operation. For example, the configuration change notification may be "netconf-config-change" notification as illustrated in FIG. 4.

In an implementation, the type of the edit operation indicates deleting the target, and then the value of the edit operation is null.

In another implementation, the type of the edit operation indicates creating or modifying the target, and then the value of the edit operation indicates a value the target of the edit operation is created or modified to have.

At step S530, the network device transmits the configuration change notification to the network management system.

In an implementation, step S520 may include the following steps of: building a new datastore based on the received RPC message and a current datastore, the current datastore storing a current configuration before the edit operation and the new datastore storing a new configuration after the edit operation; comparing the new datastore with the current datastore; creating a difference datastore based on the comparing, the difference datastore storing a configuration difference between the new configuration and the current configuration; and generating the configuration change notification based on the configuration difference. As an example of this implementation, said generating the configuration change notification based on the configuration difference may include: setting the value of the edit operation based on the configuration difference.

Figure 6:
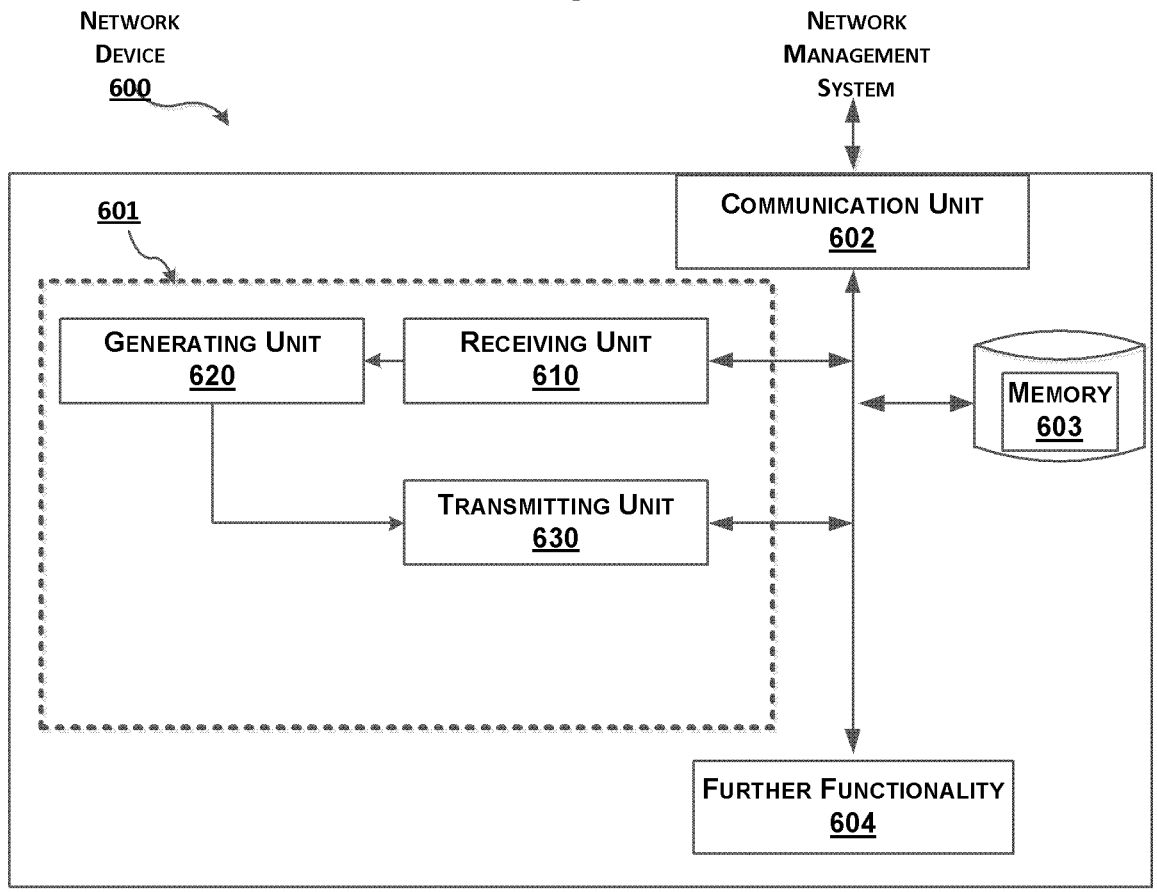
FIG. 6 is a schematic block diagram of a network device 600 according to an embodiment of the present disclosure.

FIG. 6 is a schematic block diagram of a network device 600 according to an embodiment of the present disclosure. The network device 600 is to perform network management based on the NETCONF protocol.

The part of the network device 600 which is most affected by the adaptation to the herein described method, e.g., the method 500, is illustrated as an arrangement 601, surrounded by a dashed line. The network device 600 and arrangement 601 are further configured to communicate with other entities such as a network management system via a communication unit 602 which may be regarded as part of the arrangement 601. The communication unit 602 comprises means for wireless or wired communication. The arrangement 601 or the network device 600 may further comprise other functional units 604, such as functional units providing regular functions for a network device, and may further comprise one or more memories 603.

The arrangement 601 could be implemented, e.g., by one or more of: a processor or a microprocessor and adequate software and memory for storing of the software, a Programmable Logic Device (PLD), or other electronic component(s) or processing circuitry configured to perform the actions described above, and illustrated, e.g., in FIG. 5. The arrangement part of the network device 600 may be implemented and/or described as follows.

Referring to FIG. 6, the network device 600 comprises a receiving unit 610, a generating unit 620 and a transmitting unit 630.

The receiving unit 610 may be configured to receive a RPC message from a network management system. The RPC message instructs the network device to perform an edit operation on the network device's configuration.

The generating unit 620 may be configured to generate a configuration change notification (e.g., the "netconf-config-change" notification as illustrated in FIG. 4) based on the received RPC message to indicate that the network device's configuration has changed. The configuration change notification may specifically indicate a target of the edit operation, a type of the edit operation, and a value of the edit operation.

In an implementation, the generating unit 620 may be further configured to: build a new datastore based on the received RPC message and a current datastore, the current datastore storing a current configuration before the edit operation and the new datastore storing a new configuration after the edit operation; compare the new datastore with the current datastore; create a difference datastore based on the comparing, the difference datastore storing a configuration difference between the new configuration and the current configuration; and generate the configuration change notification based on the configuration difference. As an example of this implementation, said generating the configuration change notification based on the configuration difference may include: setting the value of the edit operation based on the configuration difference.

The transmitting unit 630 may be configured to transmit the configuration change notification to the network management system.

In an implementation, the type of the edit operation indicates deleting the target, and then the value of the edit operation is null.

In another implementation, the type of the edit operation indicates creating or modifying the target, and the value of the edit operation indicates a value the target of the edit operation is created or modified to have.

Figure 7:
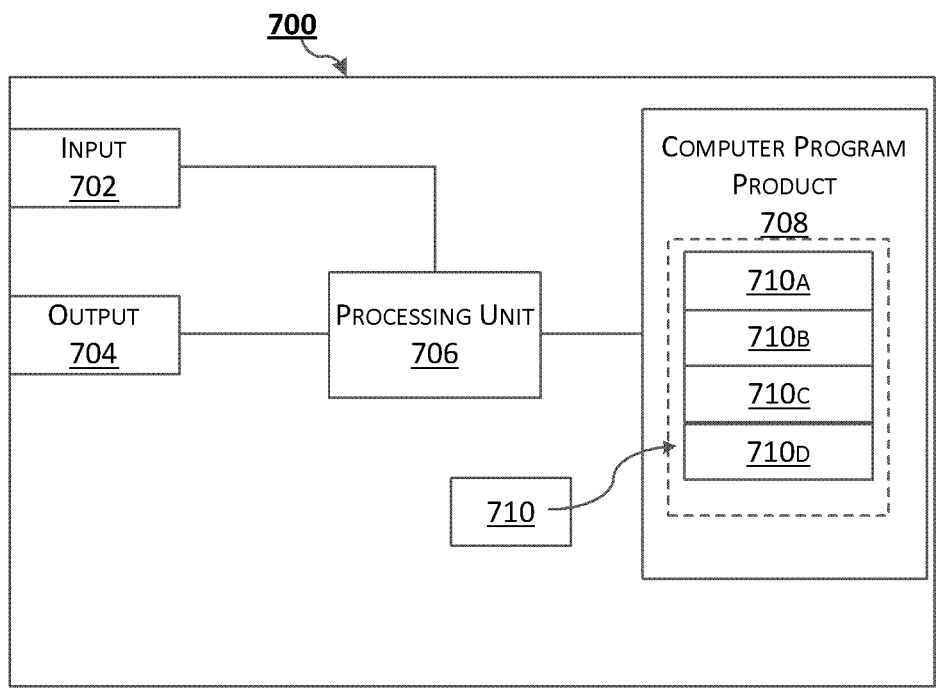
FIG. 7 schematically shows an embodiment of an arrangement 700 comprising at least one particular computer program product 708 according to embodiments of the present disclosure.

FIG. 7 schematically shows an embodiment of an arrangement 700 comprising at least one particular computer program product 708 according to embodiments of the present disclosure. The arrangement 700 may be used in the network device 600 according to the present disclosure. Comprised in the arrangement 700 are here a processing unit 706, e.g., with a Digital Signal Processor (DSP). The processing unit 706 may be a single unit or a plurality of units to perform different actions of procedures described herein. The arrangement 700 may also comprise an input unit 702 for receiving signals from other entities, and an output unit 704 for providing signal(s) to other entities. The input unit and the output unit may be arranged as an integrated entity or as illustrated in the example of FIG. 7.

Furthermore, the at least one computer program product 708 may be in the form of a non-volatile or volatile memory, e.g., an Electrically Erasable Programmable Read-Only Memory (EEPROM), a flash memory and a hard drive. The computer program product 708 comprises a computer program 710, which comprises code/computer readable instructions, which when executed by the processing unit 706 in the arrangement 700 causes the arrangement 700 and/or the network device in which it is comprised to perform the actions, e.g., of the procedure described earlier in conjunction with FIG. 5.

The computer program 710 may be configured as a computer program code structured in computer program modules 710A-710D. Hence, in an exemplifying embodiment when the arrangement 700 is used in the network device 600, the code in the computer program of the arrangement 700 includes a receiving module 710A, for receiving a RPC message from a network management system. The RPC message instructs the network device to perform an edit operation on the network device's configuration. The code in the computer program 710 further includes a generating module 710B, for generating a configuration change notification based on the received RPC message to indicate that the network device's configuration has changed. The configuration change notification indicates a target of the edit operation, a type of the edit operation, and a value of the edit operation. The code in the computer program 710 may further include a transmitting module 710C, for transmitting the configuration change notification to the network management system. The code in the computer program 710 may comprise further modules, illustrated as module 710D, e.g. for controlling and performing other related procedures associated with the network device's operations.

The computer program modules could essentially perform the actions of the flow illustrated in FIG. 5, to emulate the network device 600. In other words, when the different computer program modules are executed in the processing unit 706, they may correspond, e.g., to the units 610-630 of FIG. 6.

Although the code means in the embodiments disclosed above in conjunction with FIG. 7 are implemented as computer program modules which when executed in the processing unit causes the device to perform the actions described above in conjunction with the figures mentioned above, at least one of the code means may in alternative embodiments be implemented at least partly as hardware circuits.

The processor may be a single CPU (Central processing unit), but could also comprise two or more processing units. For example, the processor may include general purpose microprocessors; instruction set processors and/or related chips sets and/or special purpose microprocessors such as Application Specific Integrated Circuit (ASICs). The processor may also comprise board memory for caching purposes. The computer program may be carried by a computer program product connected to the processor. The computer program product may comprise a computer readable medium on which the computer program is stored. For example, the computer program product may be a flash memory, a Random-access memory (RAM), a Read-Only Memory (ROM), or an EEPROM, and the computer program modules described above could in alternative embodiments be distributed on different computer program products in the form of memories within the network device.

The present disclosure is described above with reference to the embodiments thereof. However, those embodiments are provided just for illustrative purpose, rather than limiting the present disclosure. The scope of the disclosure is defined by the attached claims as well as equivalents thereof. Those skilled in the art can make various alternations and modifications without departing from the scope of the disclosure, which all fall into the scope of the disclosure.

The invention claimed is:

1. A method used in a network device for network management based on NETwork CONFiguration (NETCONF) protocol, the method comprising:
   receiving a Remote Procedure Call (RPC) message from a network management system, the RPC message instructing the network device to perform an edit operation on a configuration of the network device;
   generating a configuration change notification based on the received RPC message to indicate that the configuration of the network device has changed, the configuration change notification indicating a target of the edit operation, a type of the edit operation, and a value of the edit operation, wherein said generating the configuration change notification comprises building a new datastore based on the received RPC message and a current datastore, the current datastore storing a current configuration of the network device before the edit operation and the new datastore storing a new configuration of the network device after the edit operation; and
   transmitting the configuration change notification to the network management system.

2. The method according to claim 1, wherein said generating the configuration change notification further comprises:
   comparing the new datastore with the current datastore;
   creating a difference datastore based on the comparing, the difference datastore storing a configuration difference between the new configuration and the current configuration; and
   generating the configuration change notification based on the configuration difference.

3. The method according to claim 2, wherein said generating the configuration change notification based on the configuration difference comprises:
   setting the value of the edit operation based on the configuration difference.

4. The method according to claim 1, wherein the type of the edit operation indicates deleting the target, and the value of the edit operation is null.

5. The method according to claim 1, wherein the type of the edit operation indicates creating or modifying the target, and the value of the edit operation indicates a value the target of the edit operation is created or modified to have.

6. A network device, device comprises a processor for network management based on NETwork CONFiguration (NETCONF) protocol, the network device comprising:
  a receiving unit configured to receive a Remote Procedure Call (RPC) message from a network management system, the RPC message instructing the network device to perform an edit operation on a configuration of the network device;
  a generating unit configured to generate a configuration change notification based on the received RPC message to indicate that the configuration of the network device has changed, the configuration change notification indicating a target of the edit operation, a type of the edit operation, and a value of the edit operation, wherein said generating unit is further configured to build a new datastore based on the received RPC message and a current datastore, wherein the current datastore stores a current configuration of the network device before the edit operation, and wherein the new datastore stores a new configuration of the network device after the edit operation; and
  a transmitting unit configured to transmit the configuration change notification to the network management system.

7. The network device according to claim 6, wherein said generating unit is further configured to:
  compare the new datastore with the current datastore;
  create a difference datastore based on the comparing, the difference datastore storing a configuration difference between the new configuration and the current configuration; and
  generate the configuration change notification based on the configuration difference.

8. The network device according to claim 7, wherein said generating unit is further configured to:
  set the value of the edit operation based on the configuration difference to generate the configuration change notification.

9. The network device according to claim 6, wherein the type of the edit operation indicates deleting the target, and the value of the edit operation is null.

10. The network device according to claim 6, wherein the type of the edit operation indicates creating or modifying the target, and the value of the edit operation indicates a value the target of the edit operation is created or modified to have.

11. A network device for network management based on NETwork CONFiguration (NETCONF) protocol, the network device comprising:
  a processor; and
  a memory storing instructions that when executed on the processor, cause the network device to:
    receive a Remote Procedure Call (RPC) message from a network management system, the RPC message instructing the network device to perform an edit operation on a configuration of the network device;
    generate a configuration change notification based on the received RPC message to indicate that the configuration of the network device has changed, the configuration change notification indicating a target of the edit operation, a type of the edit operation, and a value of the edit operation, wherein said instructions that when executed on the processor further cause the network device to build a new datastore based on the received RPC message and a current datastore, wherein the current datastore stores a current configuration of the network device before the edit operation, and wherein the new datastore stores a new configuration of the network device after the edit operation; and
    transmit the configuration change notification to the network management system.

12. The network device according to claim 11, wherein said instructions that when executed on the processor further cause the network device to:
  compare the new datastore with the current datastore;
  create a difference datastore based on the comparing, wherein the difference datastore stores a configuration difference between the new configuration and the current configuration; and
  generate the configuration change notification based on the configuration difference.

13. The network device according to claim 12, wherein said instructions that when executed on the processor further cause the network device to:
  set the value of the edit operation based on the configuration difference to generate the configuration change notification.

14. The network device according to claim 11, wherein the type of the edit operation indicates deleting the target, and the value of the edit operation is null.

15. The network device according to claim 11, wherein the type of the edit operation indicates creating or modifying the target, and the value of the edit operation indicates a value the target of the edit operation is created or modified to have.

16. A non-transitory computer readable medium storing instructions that when executed by a processing unit of a network device for network management based on NETwork CONFiguration (NETCONF) protocol, cause the network device to:
  receive a Remote Procedure Call (RPC) message from a network management system, the RPC message instructing the network device to perform an edit operation on a configuration of the network device;
  generate a configuration change notification based on the received RPC message to indicate that the configuration of the network device has changed, the configuration change notification indicating a target of the edit operation, a type of the edit operation, and a value of the edit operation, wherein the instructions that when executed by the processing unit of the network device further cause the network device to build a new datastore based on the received RPC message and a current datastore, wherein the current datastore stores a current configuration of the network device before the edit operation, and wherein the new datastore stores a new configuration of the network device after the edit operation; and
  transmit the configuration change notification to the network management system.

* * * * *